(12) United States Patent
Chang

(10) Patent No.: US 7,170,529 B2
(45) Date of Patent: Jan. 30, 2007

(54) IMAGE PROCESSING

(75) Inventor: Ke Yu Chang, San Jose, CA (US)

(73) Assignee: Sigmatel, Inc., Austin, TX (US)

( * ) Notice: Subject to any disclaimer, the term of this patent is extended or adjusted under 35 U.S.C. 154(b) by 312 days.

(21) Appl. No.: 10/693,814

(22) Filed: Oct. 24, 2003

(65) Prior Publication Data

US 2005/0088455 A1    Apr. 28, 2005

(51) Int. Cl.
*G09G 5/02* (2006.01)
(52) U.S. Cl. ............... 345/604; 345/598; 345/591; 345/606; 345/611
(58) Field of Classification Search ............... 345/604, 345/589, 591, 606, 611
See application file for complete search history.

(56) References Cited

U.S. PATENT DOCUMENTS

| | | | | |
|---|---|---|---|---|
| 6,137,952 A | * | 10/2000 | Hogan | 386/94 |
| 6,256,068 B1 | * | 7/2001 | Takada et al. | 348/441 |
| 6,304,269 B1 | * | 10/2001 | Ito | 345/589 |
| 6,628,330 B1 | * | 9/2003 | Lin | 348/252 |
| 2002/0033900 A1 | * | 3/2002 | Honma et al. | 348/581 |
| 2002/0135683 A1 | * | 9/2002 | Tamama et al. | 348/222 |
| 2003/0067548 A1 | * | 4/2003 | Sugimori | 348/273 |

* cited by examiner

*Primary Examiner*—Kee M. Tung
*Assistant Examiner*—Mike Rahmjoo
(74) *Attorney, Agent, or Firm*—Toler Schaffer, LLP

(57) ABSTRACT

A RGB to YUV conversion is presented that provides separate lumina and chroma filtering to produce the Y data block, and the U and V data blocks. Lumina filter interpolation is performed with, for example, a 5-tap filter while chroma filtering interpolation is performed with, for example, a 7-tap filter. The filtering arrangements take advantage of the eye's higher visual sensitivity to spatial variation compared to color variation.

3 Claims, 11 Drawing Sheets

IMAGE PROCESSING

BACKGROUND

1. Field of the Invention

The present invention is related to image processing and, in particular, to an image processing system having an RGB to YUV conversion.

2. Summary of Related Art

There is current interest in all aspects of acquiring and transmitting multimedia images over various media. The speed of acquiring and encoding data is crucial to the successful real-time transmission of multi-media images over various media. Further, in some applications, the speed of encoding data is also crucial for acquiring and encoding data for multimedia images. Video data can be digitally acquired with a multi-pixel array of video sensors. These sensors are usually arranged in an RGB format, and therefore data is obtained from the video sensors in RGB format.

A recently developed encoding scheme for multi-media images is MPEG-4. Typical implementations of MPEG-4 utilize YUV video data. Therefore, a data conversion from RGB to YUV format is performed.

Therefore, there is great interest in conversion of RGB to YUV format. Further, there is a great interest in high-resolution conversion of RGB data into YUV data for encoding and transmission.

SUMMARY OF THE INVENTION

In accordance with the present invention, processing of data from RGB format into YUV data appropriate for encoding for transmission is presented. In accordance with the invention, RGB data is translated into Y data and UV data in separate filter paths. In some embodiments, interpolation of RGB data into separate color planes in the lumina filter path includes filters with a lower number of taps than does the interpolation of RGB data into separate color planes in the chroma filter path. Filters in each path can then be optimized for the characteristics of that path.

Consequently, a RGB to YUV video filter according to the present invention includes a lumina filter path coupled to receive blocks of RGB formatted data and generate a block of lumina data; and a chroma filter path coupled to receive the blocks of RGB formatted data and generate blocks of chroma data, wherein the lumina filter path and the chroma filter path operate in parallel.

In some embodiments, the lumina filter path includes an interpolation filter and an RGB to Y conversion. In some embodiments, the interpolation filter includes a 5-tap vertical filter and a 5-tap horizontal filter. Additionally, the lumina filter path can include a gamma correction, an edge enhancement filter, and a spatial filter.

In some embodiments of the invention, the chroma filter path includes an interpolation filter and an RGB to UV conversion. In some embodiments, the interpolation filter includes a 7-tap vertical filter and a 7-tap horizontal filter. Further, the chroma filter path can include a color correction block, a gamma correction block, and a core chroma correction block.

Therefore, a method of converting RGB formatted video data to YUV formatted video data according to the present invention includes receiving a block of RGB video data; filtering the block of RGB video data through a lumina filter path; and filtering the block of RGB video data through a chroma filter path, wherein the lumina filter path and the chroma filter path are parallel paths.

In some embodiments, a 24×24 block of pixel data is received into the lumina and chroma filter paths. In some embodiments of the invention, a black-clamping adjustment is performed on the block of pixel data. In some embodiments, the block of pixel data is white-balance adjusted.

In some embodiments, filtering the block of RGB video data through a lumina filter path includes interpolating the RGB data to form red, green and blue color planes with interpolated values associated with the appropriate color in each pixel location of the red, green and blue color planes, and generating the lumina Y data block from the red, green and blue color planes. Gamma correction, edge enhancement, and spatial filtering may also be performed on the lumina data block.

In some embodiments, filtering the block of RGB video data through a chroma filter path includes interpolating the RGB data to form red, green and blue color planes with interpolated values associated with the appropriate color in each pixel location of the red, green and blue color planes. In some embodiments, vertical filter and a horizontal filter are applied to the RGB video data block. In some embodiments, the vertical filter and the horizontal filter each include a 7-tap filter. U and V data blocks can then be determined from the red, green and blue color planes. Other filters, such as color correction, gamma correction, and core chroma correction can also be applied to the data.

It is to be understood that both the foregoing general description and the following detailed description are exemplary and explanatory only and are not restrictive of the invention, as claimed. These and other aspects of the invention are further discussed below with respect to the following figures.

BRIEF DESCRIPTION OF THE DRAWINGS

FIG. 3A through 3T illustrate an embodiment of a pixel correct process according to the present invention.

In the figures, elements having the same designation perform the same or similar functions.

DESCRIPTION OF THE EMBODIMENTS

In conventional RGB to YUV conversion systems, an interpolation of the red, green and blue data in the original pixel data is made in order to project color values for pixels in the sensor array that are not sensitive to that color. From the red, green and blue interpolated data, lumina and chroma values are generated. However, these methods do not take into account the different filtering and resolution requirements for lumina versus chroma data. Consequently, systems do not optimize the filtering or interpolation process based on whether lumina data is being produced or chroma data is being produced. In accordance with the present invention, separate and parallel lumina filter paths and chroma filter paths allow conversion from the original data in a more optimum fashion for both lumina and chroma data.

Figure 1:
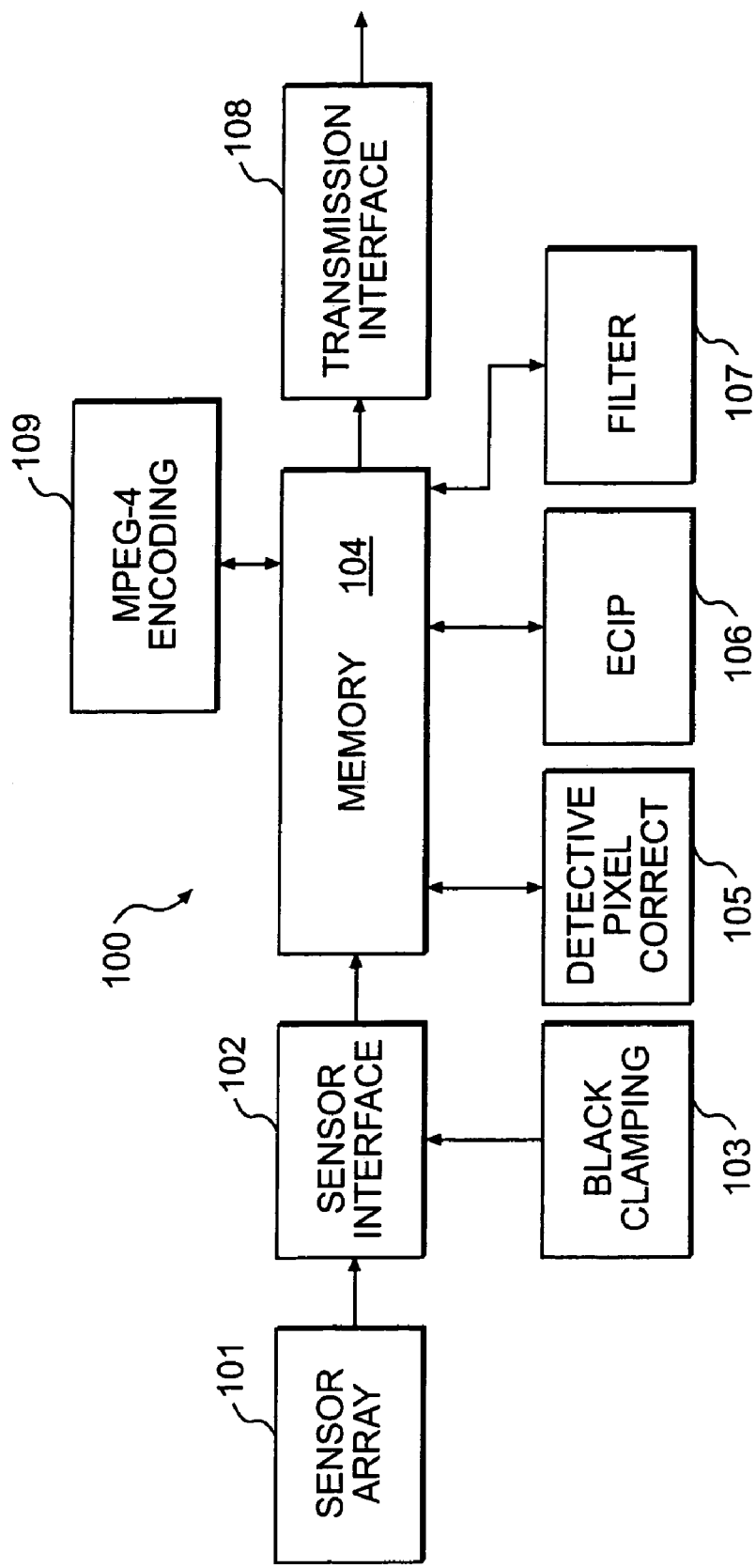
FIG. 1 shows a block diagram for acquiring and processing data from a video array into MPEG-4 format according to the present invention.

FIG. 1 shows an image processing circuit 100 according to the present invention. Image processing circuit 100 includes a sensor array 101 for detecting an image and a memory 104 for storing image data while that image data is being processed. Sensor interface 102 reads data from sensor array 101 and stores that data in memory 104 for further processing. Black clamping 103 determines the black-level offset for the pixels in sensor array 101. Defective pixel correct 105 processes data that has been written into memory 104 by sensor interface 102. The Enhanced CCD/CMOS Image Process (ECIP) module 106 provides image data processing and conversion to YUV format. Filter 107 provides further filtering of data before the data is encoded with MPEG-4 encoder 109. Once encoded, the data can then be transmitted.

In accordance with the present invention, ECIP module 106 includes separate parallel filtering paths to produce lumina data, Y data, and chroma data, U and V data, from the RGB formatted data from sensor array 101. The separate parallel filtering paths include separate interpolations of the RGB data into red, green and blue color planes to take better advantage of the eye's greater sensitivity to spatial variation rather than color variation.

Some embodiments of the invention may implement the filters and other processes here in hardware or with a microprocessor. Although a microprocessor implementation provides greater versatility in modifying algorithms, the hardware implementation provides faster data processing speeds. Therefore, in the present disclosure, block diagrams are provided for a hardware implementation. A software implementation, however, can also be produced from this disclosure.

Memory 104 can be any memory large enough to hold the video data from sensor array while it is being processed and any intermediate results calculated by the various processing blocks. Memory 104 can include any type of RAM, including dynamic or static RAM. In some embodiments, DRAM is utilized. Memory 104 may also include flash memory for non-volatile storage of various programmable parameters and values that may be utilized over a long period of time. For example, the identification of invalid or non-function pixels in sensor array 101 may be stored in a flash memory portion of memory 104 and may be downloaded during operation into other portions of memory 104 for faster access. In some embodiments, memory 104 includes 128 Mb or 256 Mb DRAM. Some embodiments include larger memories.

Figures 2A, 2B:
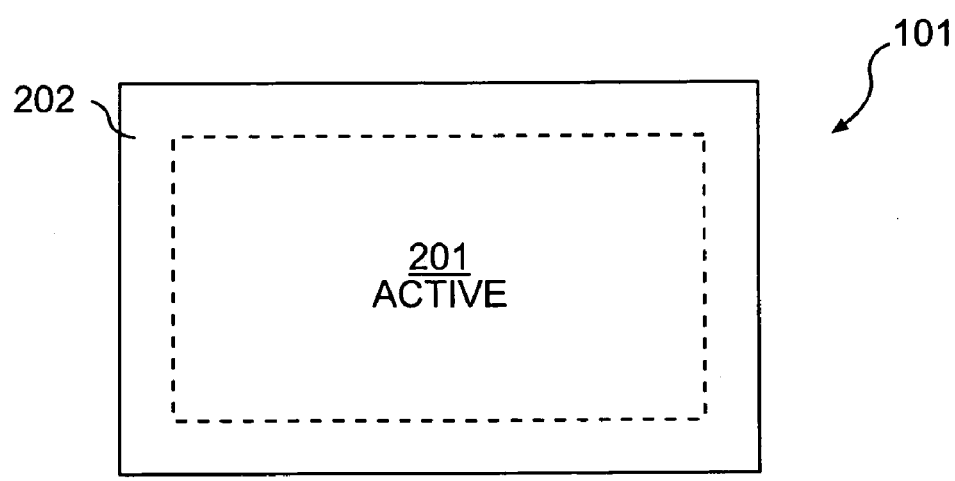
FIG. 2A illustrates RGB pixel format for the sensor shown in FIG. 1.
FIG. 2B illustrates the sensor array shown in FIG. 1.

Sensor array 101 is typically a RGB format sensor array, such as that shown in FIG. 2A. As shown in FIG. 2A, sensor array 101 is arranged as a series of pixels that are light sensitive to green, red or blue light. The format shown in FIG. 2A is referred to as the "Bayer" format. In the Bayer format, each line and each column of pixels are alternatively sensitive to green and either red or blue. A 2 by 2 array of pixels, for example, would have two green sensitive pixels and one red sensitive pixel and one blue sensitive pixel. The active pixel array can include any number of pixels in the RGB format. Such sensor arrays are used in charge-coupled devices and CMOS sensors. Charge coupled device vendors include Sony, Panasonic, Kodak, Sharp, and Sanyo. CMOS sensors are produced, for example, by Agilent, and OmniVision.

Data is read from the pixel array of sensor array 101 by sensor interface 102. Typically, sensor interface 102 serially reads the time-integrated value for each of the pixels in sensor array 101 and writes that data into memory 104. In some embodiments, data read into memory 104 is digitized to 10 bits. In some embodiments, numerical values for 12 pixels are stored in a 128 bit (16 word) area of DRAM 104. Since typical DRAMs are word addressable, pixel data, which is often 10 bit unsigned data, is packed into 16 word segments for storage in a DRAM section of memory 104. Other function blocks that access memory 104 to retrieve or store data, then, need to pack and unpack data into memory 104 in the same way. In this way, for example, 24 by 24 pixel blocks of data can be stored in memory 104 for later processing.

As shown in FIG. 2B, sensor array 101 typically includes an active region 201 and a dark region 202. Data from dark region 202 is averaged in black clamping 103. For each channel in the 2×2 pixel array (i.e., the $G_0$, B, R and $G_1$ channels), an average of the values from pixels in the dark region 202 is calculated. That data can be stored as dark-value offsets in memory 104, or in some embodiments stored in registers in black clamping 103 for use in a later offset correction.

Defective pixel correct 105 fills in the values for inoperable pixels in sensor array 101. In some embodiments, the particular pixels that are considered to be defective are identified and that identification is stored in memory 104. In some embodiments, that identification may be supplied by the manufacturer of sensor array 101. In some embodiments, a determination of the defective pixels can be determined, for example, by selectively exposing sensory array 101 and measuring the response of each of the pixels in sensor array 101. For example, defective pixels can be determined by exposing sensor array 101 to white light for a particular period of time (the exposure time) and monitoring the output signal from each of the red, green, and blue pixels, which typically is an integrated value indicating the total amount of white light incident on the pixel for the particular period of time.

Figures 3A, 3B, 3C, 3D, 3E, 3F, 3G, 3H:
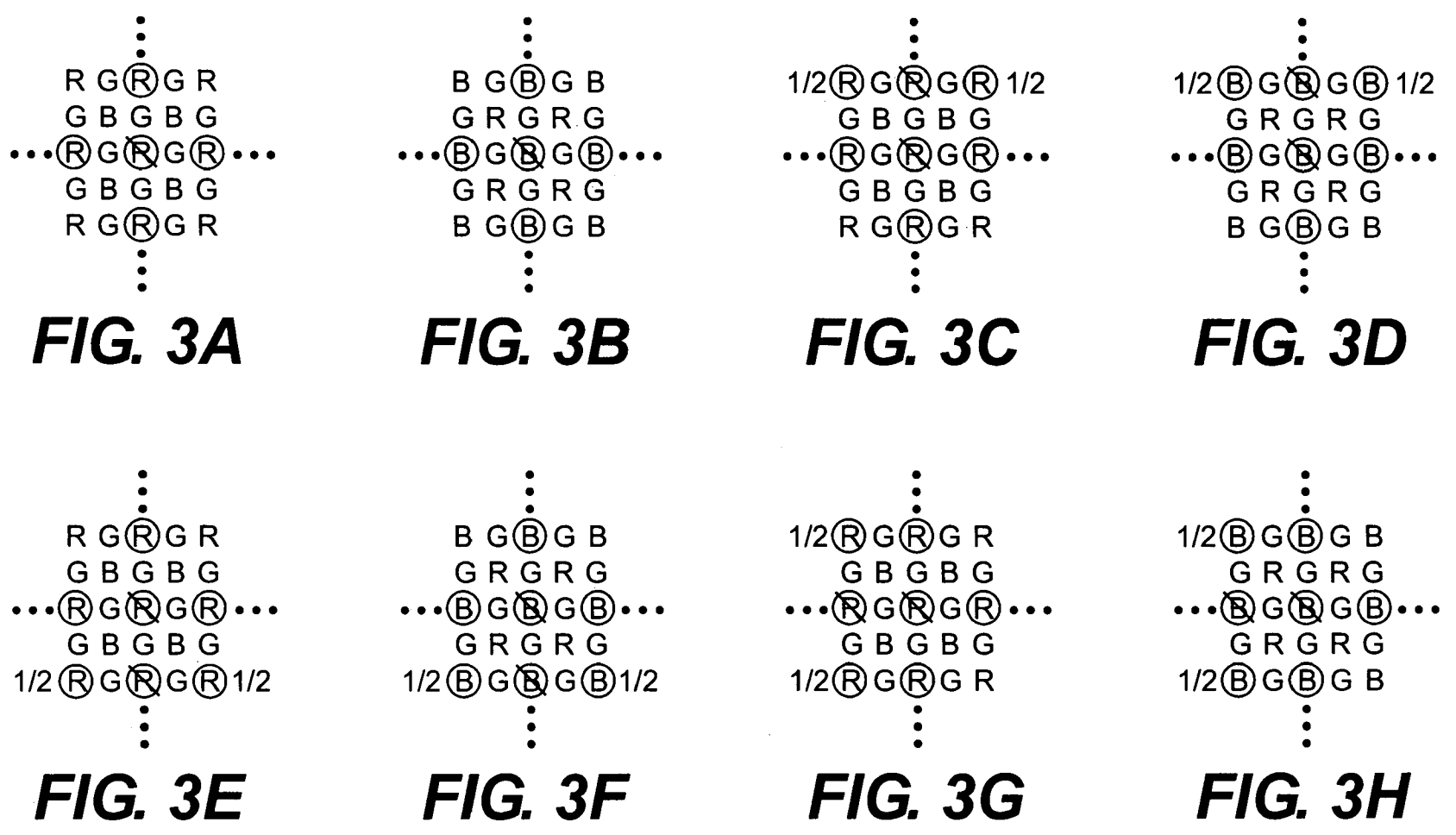
Figures 3I, 3J, 3K, 3L, 3M, 3N, 3O, 3P:
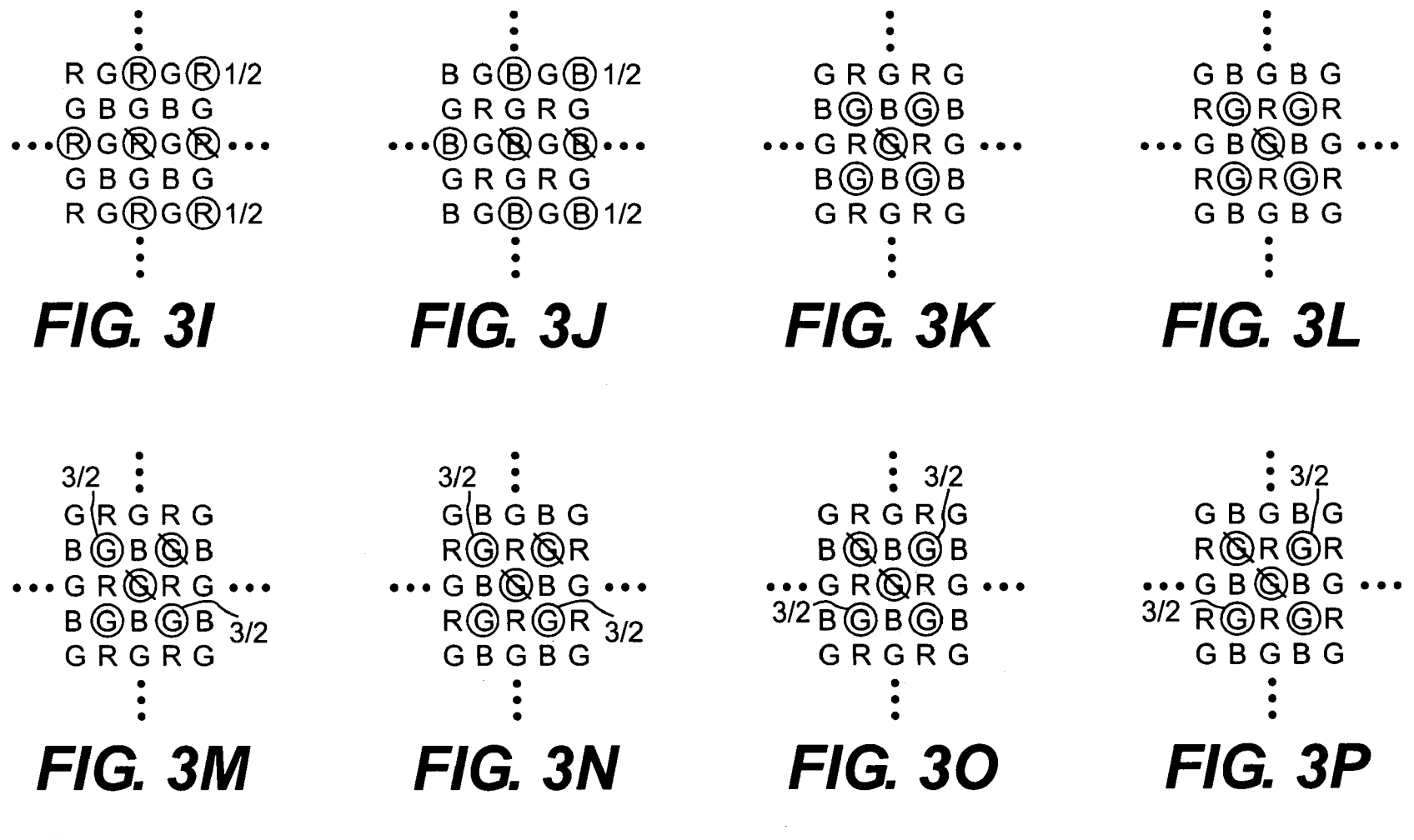
Figures 3Q, 3R, 3S, 3T:
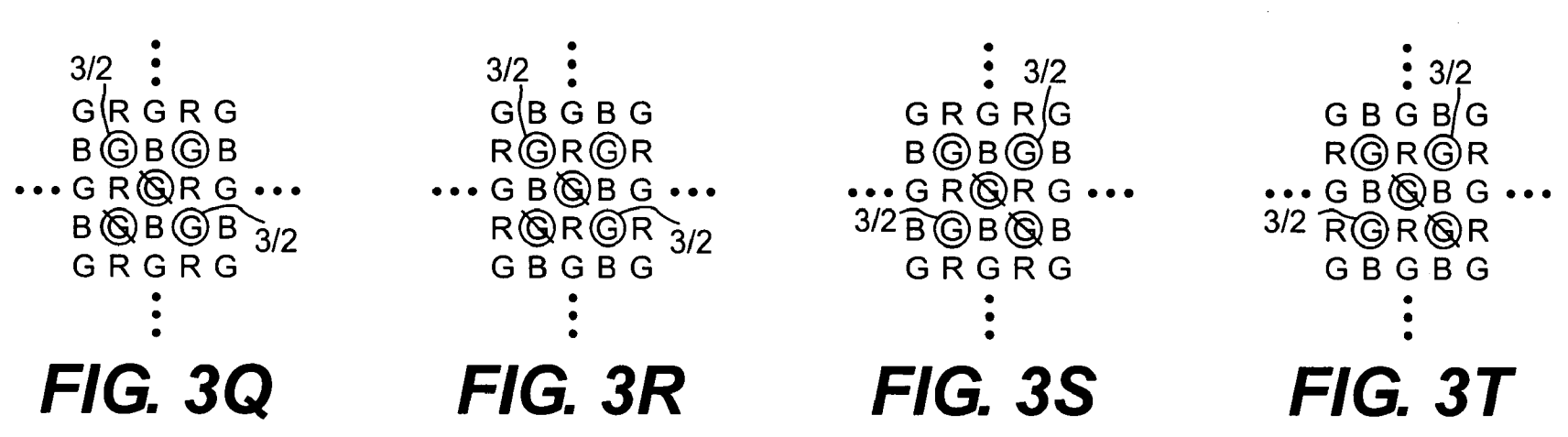

FIGS. 3A through 3T illustrate correction for bad pixels. In general, the defective pixel is corrected based on the values of neighboring pixels of the same type. The expected value for an invalid pixel can be calculated by utilizing the values of the functioning pixels that are nearest or next-nearest neighbors of that pixel. For example, in FIG. 3A the red pixel designated with the ⊗symbol is an invalid pixel. The value for that invalid pixel can be replaced utilizing the value of the surrounding red pixels that are circled. In one type of correction, the median value of the circled pixels is utilized as the value of the defective pixel. In some embodiments, the average value of the circled pixels can be utilized as the value of the defective pixel. In some embodiments, the type of correction that is used for each of the defective pixels identified can also be stored in memory 104 and may be user programmable.

In FIG. 3A, a single red pixel at the center of a 5×5 block of pixels in the pixel array of sensor array 101 is defective. As was discussed above, the numerical value that replaces the value for the defective red pixel can be calculated by the four surrounding nearest-neighbor red pixels in sensory array 101. FIG. 3B shows the similar case with a defective blue pixel. The numerical value for the defective blue pixel is replaced with a value calculated from the four nearest-neighbor blue pixels surrounding the defective pixel. As discussed above, the numerical value for the defective pixel can be either the average of the surrounding blue pixels or the median of the blue pixels, depending on the type of correction.

FIGS. 3C through 3J illustrate situations where the 5×5 block of pixels includes a second invalid pixel of the same color as the identified defective pixel. FIG. 3C, for example, illustrates a defective red pixel where the nearest-neighbor red pixel two rows above the defective crystal is also defective. In that case, the numerical value of the defective pixel in FIG. 3C can be corrected utilizing numerical values from the three non-defective nearest-neighbor pixels (shown circled) and the two next-nearest-neighbor pixels closest to the second defective pixel. The two next-nearest-neighbor pixels can be weighted by ½ compared with the nearest-neighbor pixels in the calculation. Again, the weighted mean or average of the numerical values of the pixels shown circled in FIG. 3C can be utilized to replace the numerical value of the defective pixel at the center of the 5×5 block of pixels shown in FIG. 3C. FIG. 3D shows the same correction for a similarly affected blue pixel. FIGS. 3E through 3J illustrate corrections of the defective pixel (which may be red or blue) at the center of the 5×5 pixel array with various orientations of a second defective pixel of the same type as the pixel being corrected.

FIGS. 3K and 3L illustrate correction of defective green pixels. In FIG. 3K, the center defective green pixel is from a different channel than the defective green pixel illustrated in FIG. 3L. With no other defective green pixel as a nearest-neighbor to the defective green pixel, the numerical value representing the defective green pixel can be replaced with either an average or the mean of the numerical values of the surrounding nearest-neighbor green pixels.

FIGS. 3M through 3T illustrate various configurations of corrections where one of the nearest-neighbor green pixels to the green pixel currently being corrected is also a defective pixel. In the embodiment illustrated in FIGS. 3M through 3T, the two nearest neighbor green pixels that are closest to the second defective pixel are weighted by 3/2 in the calculation of the numerical value for the identified defective pixel.

The embodiment of defective pixel correction illustrated in FIGS. 3A through 3T essentially utilizes numerical values for non-defective nearest-neighbor same-color pixels in a calculation to determine the numerical value of the identified defective pixel. Some embodiments of the invention may utilize further pixels in determining the numerical value of the defective pixel. For example, by utilizing numerical values for pixels further removed from the identified defective pixel, a numerical modeling routine may by utilized to determine a numerical value for the identified defective pixel. However, the more complicated is the computation, the slower is the process for determining the corrected numerical value for the defective pixel.

In operation, defective pixel correct 105 reads the location of an identified defective pixel from memory 104. The numerical values of nearest-neighbor or next-nearest-neighbor, non-defective pixels of the same color are then read from memory 104, as illustrated in FIGS. 3A through 3T. A numerical value for the identified defective pixel is then calculated. The new numerical value can then be written into memory 104 to replace any value read for the identified defective pixel. Defective pixel correct 105 can operate on memory 104 concurrently with transfer of data from sensor interface 102 so long as all of the data required for a particular correction has been transferred to memory 104.

Figure 4:
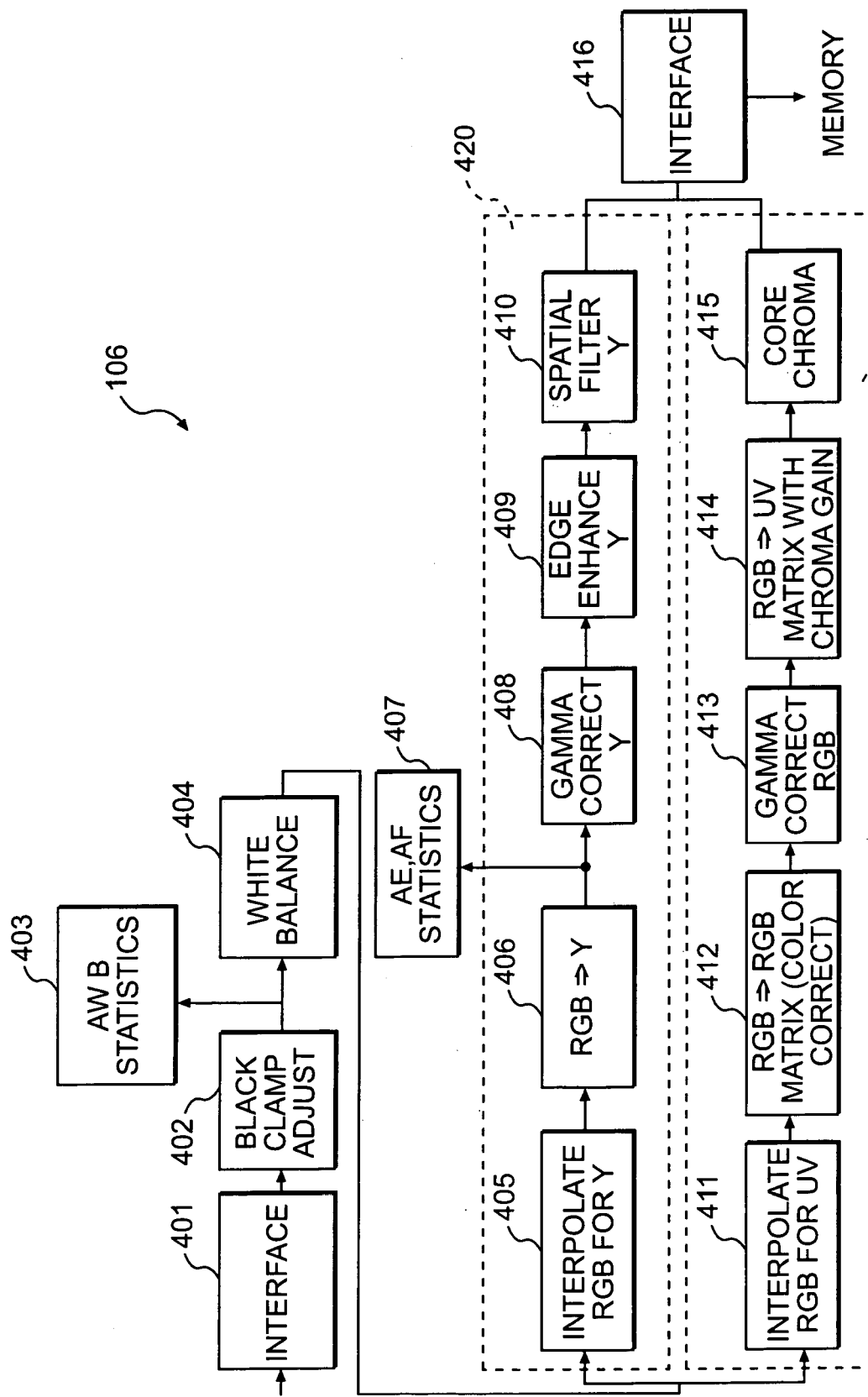
FIG. 4 illustrates an embodiment of an Enhanced CCD/CMOS Image Process (ECIP) block according to the present invention.

FIG. 4 shows a block diagram of an ECIP block 106 according to the present invention. In accordance with the present invention, block 106 includes a lumina filter path 420 and a separate chroma filter path 422. Lumina filter path 420 and chroma filter path 422 separately operate on RGB data read from memory 104.

ECIP block 106 includes a receive interface 401 for reading data from memory 104. In general, receive interface 401 reads N×N pixel blocks of data from memory 104. In some embodiments, data is written into memory by sensor interface 102 in such a way that it can be easily read out as blocks of pixel data. For example, if the numerical values representing each pixel is 10 bits and the data is stored in 16 word blocks (128 bits), then blocks of, for example, 12 by 12 or 24 by 24 pixels are readily retrieved from memory 104. In some embodiments, then, N is 24 and 24×24 pixel blocks of data are input to ECIP block 106 for block processing. Receive interface 401 reads the pixel data in block format and unpacks the data to form the numerical values representing individual pixels in the block.

Black clamp adjust 402, which in FIG. 4 receives the N×N pixel block data from receive interface 401, corrects each pixel value for a black value offset. In some embodiments, an optical value for each channel is calculated in black clamping 103 (FIG. 1). The values for each channel of pixel (i.e., the two green channels, the red channel and the blue channel), then, calculated by black clamping 103 can be subtracted in black clamp adjust 402. In some embodiments, black clamp adjust 402 can adjust the value for each pixel in the N×N data block by subtracting from it the offset value calculated for the channel of that pixel. In some embodiments, a set value stored in an offset register can be subtracted instead. In some embodiments, the choice between subtracting the calculated block offset value or the set black offset value can be programmed. In some embodiments, the numerical value representing each pixel may now have more bits and may be signed rather than unsigned. For example, if the numerical values for each pixel stored into memory 104 was 10 bit unsigned data, black clamp adjust 402 may output 11 bit signed data.

The new pixel data block generated in black clamp adjust 402 is input to AWB (all white balance) statistics 403. AWB statistics 403 calculates, for example, the average for each channel of pixel, the number of pixels in each channel with numerical values higher than a programmed limit, and the number of pixels in each channel with numerical values lower than a programmed limit. Statistical data can be stored in registers and held in latches between blocks of data. In some embodiments, the statistics compiled by AWB statics 403 can be utilized, after a number of blocks, for example 64 blocks, of pixels have been processed.

The new block data generated by black clamp adjust 402 is also input to white balance 404. White balance 404 adjusts the numerical values for pixels in each channel by a gain value in order to maintain a balance of data. In some embodiments, a constant average value for the numerical value in each channel is maintained. The numerical values for each of the pixels can be multiplied by a gain value designated for the channel of that pixel such that the average value for that channel calculated in AWB statistics 403 is at a particular value for that channel.

In some embodiments, where the numerical value for each of the pixels output from black clamp adjust 402 is 11-bit signed data, the numerical values for each of the channels is multiplied by a 12-bit unsigned "gain coefficient"

(i.e. $G_0'=G_0*C_0$, $B'=B*C_1$, $R'=R*C_2$, and $G_1'=G_1*C_3$). In some embodiments, a "512" value for the coefficient is unity. The signed result can be rounded and descaled (i.e., bit-shifted to form a divide by 16) to 11 bit signed data. In some embodiments, an extra black offset subtract ($C_4$) can be subtracted from the numerical value for each pixel. In some embodiments, the numerical value for each pixel can be low-range clamped at –128 and high-range clamped at a programmable value ($C_5$). In some embodiments, the numerical values can be scaled by values obtained in AWB statistics 403.

The N×N pixel block of data output from white balance 404 is then input to both a lumina filter path 420 and a chroma filter path 422. Lumina filter path 420 can include edge enhancement, gamma correction, and spatial filters while determining the lumina Y numerical values. In some embodiments, lumina filter path 420 includes interpolation block 405, an RGB to Y conversion block 406, a gamma correction block 408, an edge enhancement block 409, and a spatial filter 410. In some embodiments, chroma filter path 422 includes an interpolate block 411, a color correct block 412, a gamma correct block 413, a RGB to UV conversion block 414 and a core chroma block 415.

Figure 5A:
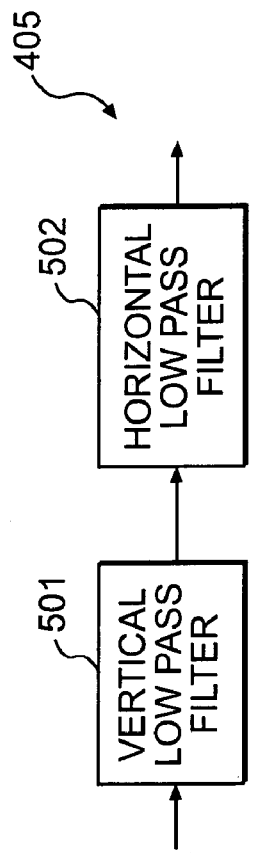
FIGS. 5A through 5E illustrate the interpolation of RGB data for the luminance filter path shown in FIG. 4.

As shown in FIG. 5A, interpolation block 405 of lumina filter path 420 filters RGB numerical values for each of the pixels in the data block both vertically and horizontally to create three separate color planes, a red color plane, a green color plane and a blue color plane. In the three separate color planes, the filtering process provides a numerical value indicating the amount of that color, determined from surrounding pixels of the same color, for each pixel location in the plane. In positions where sensor array 101 does not have a pixel sensitive to that color, the numerical value for that color can be determined by nearby pixels of the appropriate color. For example, in the red color block numerical values indicating a red level will be determined for all locations even if that location in the pixel block originally received from memory 104 indicated a green or blue color and not a red color.

In some embodiments, numerical values indicating the amount of color at each pixel location in a color plane can be interpolated from nearest neighbor like-colored numerical values. In some embodiments, a multi-tap vertical and a multi-tap horizontal filter can be applied to interpolate for numerical values in all pixel locations. In general, filters are applied to the N×N block of numerical values of the pixel data block to determine numerical values of each pixel location indicating an amount of each color of the three color planes.

FIGS. 5A through 5D illustrate the function of one embodiment of interpolation block 405 of FIG. 4. As shown in FIG. 5A, interpolation block 405 includes a vertical filter 501 and a horizontal filter 502. In the embodiment shown in FIG. 5A, vertical filter 501 is implemented before horizontal filter 502, however in some embodiments the reverse action may be performed. In yet other embodiments, the three-color planes created may be formed in one action based on surrounding values for nearest-neighbor same-colored pixels, similar to the calculations performed for defective pixels illustrated with FIGS. 3A through 3T.

Figure 5B:
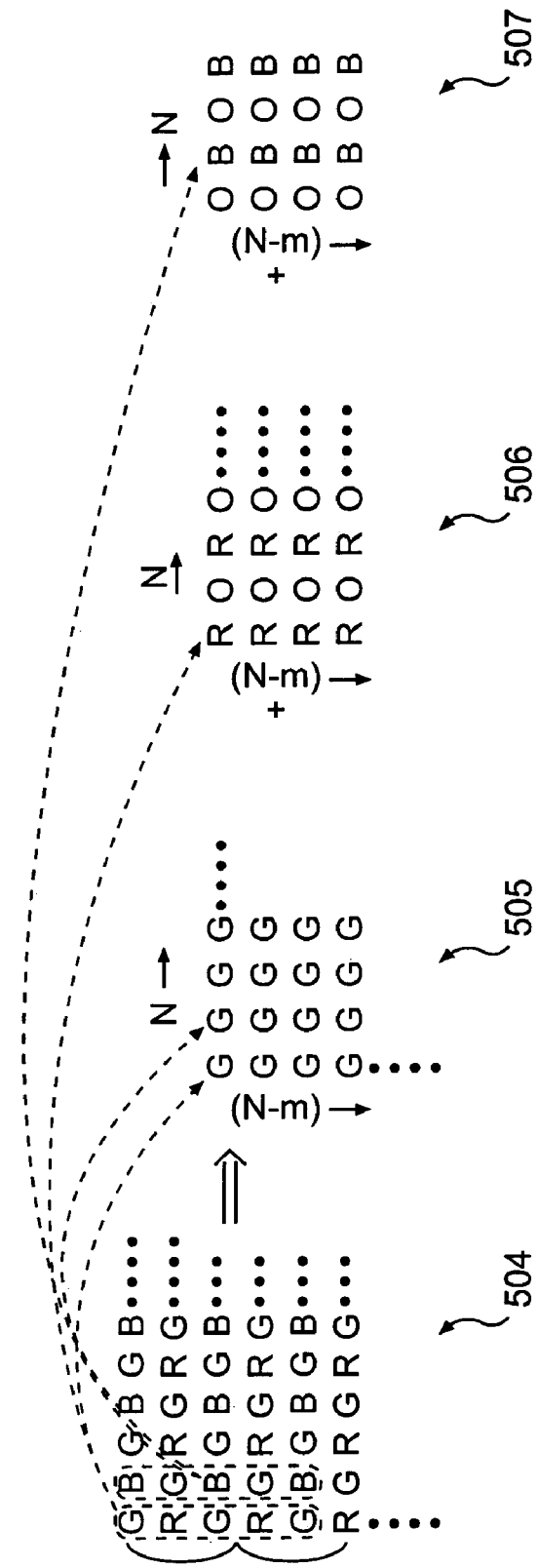

FIG. 5B illustrates schematically execution of vertical filter 501 on an N×N block of RGB pixel data 504. In some embodiments of the invention, an M-tap filter is utilized. As illustrated in FIG. 5B, M may be five (5). The output from vertical filter 501 includes three color specific color planes: a green plane 505, a red plane 506, and a blue plane 507. Each of color planes 505, 506 and 507 have a block size of (N–m)×N, with the number of rows reduced by m=(M–1). Where M is 5 and N is 24, for example, the 24×24 block input to vertical filter 501 emerges from vertical filter 501 as three 20×24 color planes, one for each of the three colors of pixels green, blue and red.

The M-tap filter usually is formed by M coefficients that weight the contribution of each of the pixels being utilized in the calculation. Only pixels of the color being filtered to form the color plane are utilized. Therefore, in forming green color plane 505 only numerical values from green pixels in pixel block data 504 are utilized. Additionally, only data from red pixels in data block 504 are utilized to form red color plane 506 and only data from blue pixels in data block 504 are utilized to form blue color plane 507.

The coefficients of the M-tap filter can be chosen to suppress spatial frequencies above Nyquist (specifically 2F, where F is the Nyquist frequency), while providing as little attenuation as possible for frequencies below Nyquist, and slight overshoot on edges below ½ Nyquest. For example, in one embodiment a 5-tap filter is utilized, with the coefficients being defined as ($t_1=-3, t_2=8, t_3=22, t_4=8, t_5=-3$). In which case, the first five pixels in the first column of the example 24×24 block 504 maps to the value in the first-column, first-row position of filtered blocks 505, 506 and 507. The two red pixels of the first five pixels in the first column of the 24×24 block map into the first-row, first-column position of the red filtered block. Because there are no blue pixels included in the first five pixels of the first column of the 24×24 block, a zero value (or null) is mapped into the first-row, first-column position of the blue block. The second row, first column positions of the colored filtered blocks are determined by applying the 5-tap filter to the second through sixth pixel values in the first column of the 24×24 block.

In general, the values of N×N block of data 504 are mapped through the M-tap filter to color planes 505, 506 and 507. M-taped filter can be expressed as ($t_1, t_2, \ldots t_M$). The mapping into color plane 505, then, can be expressed as $$G_{i,j} = \sum_{k=1}^{M} t_k P^G_{(i+k+m/2),j}$$

where $G_{i,j}$ indicates a numerical value in green color plane 505, i=1 to (N–m), j=1 to N, m=M–1 and $p_{i,j}^G$ represents the numerical values of N×N block of data 504 with non-green pixel values being set to 0. Similarly, the mapping into color plane 506 can be expressed as $$R_{i,j} = \sum_{k=1}^{M} t_k P^R_{(i+k+m/2),j}$$

where $R_{i,j}$ indicates a numerical value in the red color plane 506 and $P_{i,j}^R$ represents the numerical values of N×N block of data 504 with non-red pixel values being set to 0. Also, the mapping into color plane 507 can be expressed as $$B_{i,j} = \sum_{k=1}^{M} t_k P^B_{(i+k+m/2),j}$$

where $B_{i,j}$ indicates a numerical value in the red color plane 506 and $P_{i,j}^B$ represents the numerical values of N×N block of data 504 with non-red pixel values being set to 0. To optimize these calculations, coefficients need not be multiplied by non-existent data (i.e., for data from wrong-colored pixels). As illustrated in the example, although each position in the data block of green color plane 505 includes a numerical value indicating a level of green for that pixel, red color plane 506 and blue color plane 507 have alternating columns containing zero values because alternating columns of RGB data block 504 contain only red and only blue pixels.

As indicated above, in some embodiments a 5-tap filter is utilized with coefficients given by $(t_1, t_2, t_3, t_4, t_5)=(-3, 8, 22, 8, -3)$. Other coefficient values can b utilized in the 5-tap filter. A high value for $t_3$ can sharpen responses, but may not provide accurate projections for pixels that are not of the color currently being filtered. The chosen values (−3, 8, 22, 8, −3) provide good line sharpening, a good frequency response, and the results can be easily divided by 16 in hardware to provide for easy resealing. In some embodiments, R, B, and vertically filtered G values are divided by 16 while horizontally filtered G values are divided by 32.

Figure 5C:
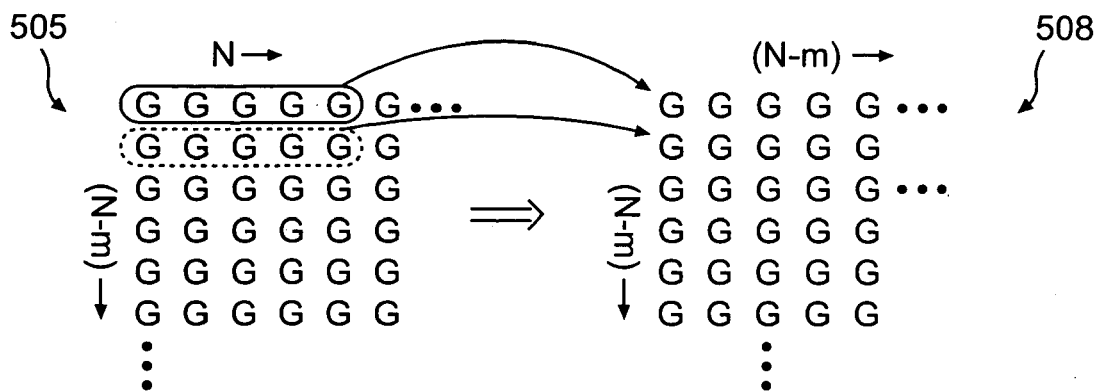
Figure 5D:
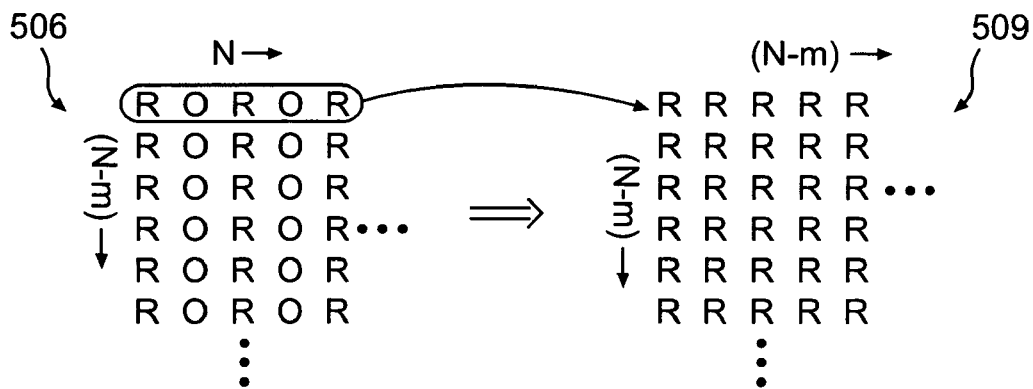
Figure 5E:
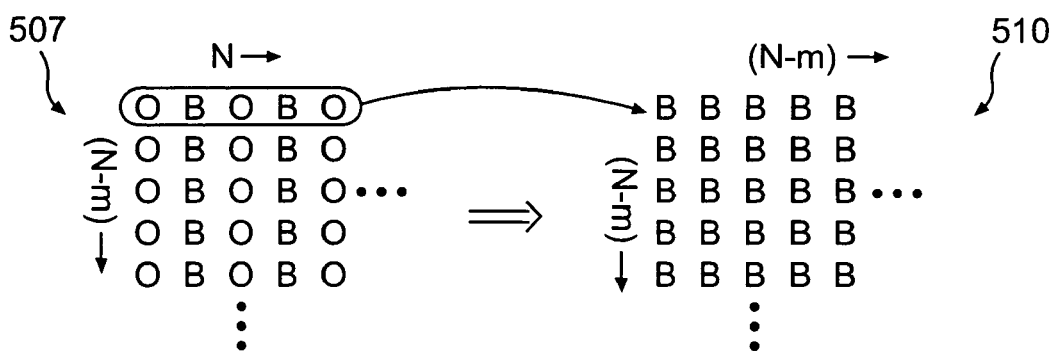

FIGS. 5C, 5D and 5E illustrate the operation of horizontal filter 502. Similarly to that described above with respect to vertical filter 501, each of color planes 505, 506 and 507 are filtered to color planes 508, 509 and 510, respectively. FIG. 5C illustrates the mapping of green color plane 505 into green color plane 508. FIG. 5D illustrates the mapping of red color plane 506 into red color plane 509. FIG. 5E illustrates the mapping of blue color plane 507 into blue color plane 510.

Although a different size filter may be utilized in horizontal filter 502, in some embodiments an M-tap filter is utilized for horizontal filtering. As a result, color planes 508, 509 and 510 have, as discussed above, m=M−1 fewer columns than color planes 505, 506 and 507, respectively. In some embodiments, the same M-tap filter is utilized in both vertical filter 501 and horizontal filter 502. In the embodiment illustrated in FIGS. 5C through 5E, the same 5-tap filter that was utilized in vertical filter 501 is utilized in horizontal filter 502. In embodiments with an M-tap filter described by $(t_1, t_2, \ldots t_M)$, the numerical values of green color plane 508 can be expressed as $$G'_{i,j} = \sum_{k=1}^{M} t_k G_{i,(j+k+m/2)},$$

where $G_{i,j}$ represents the numerical values of green color plane 505, i and j can have values from 1 to (N−m), and m=M−1. Similarly, the numerical values of red color plane 509 can be expressed as $$R'_{i,j} = \sum_{k=1}^{M} t_k R_{i,(j+k+m/2)},$$

where $R_{i,j}$ represents the numerical values in red color plane 506, and the numerical values of blue color plane 510 can be expressed as $$B'_{i,j} = \sum_{k=1}^{M} t_k B_{i,(j+k+m/2)},$$

where $B_{i,j}$ represents the numerical values in blue color plane 507. To optimize the calculations, the zero columns in red color plane 506 and blue color plane 507 may be omitted from the calculation so that coefficients are not simply multiplied by zero.

Again, in some embodiments the same 5-tap filter can be applied in horizontal filter 502 as was applied in vertical filter 501. In embodiments where a 24×24 block of data is input to vertical filter 501, three 20×20 color planes are output at horizontal filter 502. The filtering has determined values for each position in the 20×20 arrays in order to fill in for data in that color that was missed because pixels in that position in data block 504 were sensitive to other colors. Additionally, in some embodiments, the numerical values in color planes 508, 509 and 510 output from horizontal filter 502 are 10-bit unsigned data with low range clamped at 0 and high range clamped at 1023.

As shown in FIG. 4, the red, green and blue color planes output from interpolate block 405, color planes 508, 509 and 510, are input to RGB to Y block 406. RGB to Y block 406 converts data from the three color planes 508, 509 and 510 to lumina data Y. RGB to Y 406 receives the three (N−m)×(N−m) color planes and calculates an (N−m)×(N−m) lumina block Y. The numerical values in the lumina block Y can be expressed as $$Y_{i,j} = R_{i,j}' * \alpha_0 + G_{i,j}' * \alpha_1 + B_{i,j}' * \alpha_2 + \alpha_3,$$

where the coefficients $\alpha_0$, $\alpha_1$, $\alpha_2$, and $\alpha_3$ can be user programmable. In some embodiments, the coefficients $\alpha_0$, $\alpha_1$, $\alpha_2$, and $\alpha_3$ can be 12 bit unsigned values, with the value 1024 being unity. The numerical values of Y ($Y_{i,j}$) can be descaled with rounding and clamped at a low and high range, for example a low of 0 and high of 1023. The resulting numerical values of Y can be 10-bit unsigned data.

The numerical values of Y are input to statistics block 407. Statistics block 407 can calculate statistics utilized in an auto-focus feedback loop and an auto-exposure feedback loop, controlling other aspects of the image acquisition. The auto-focus (AF) statistical value can be the sum of the difference between adjacent luma pixel squared, or the absolute value. A small absolute value for the AF statistical value indicates on out-of-focus condition, the image depicted in the Y block is out of focus. The AF value, then, can be input to an autofocus circuit to control the optics in front of sensory array 101 (FIG. 1). The AF value can be summed into a sum register and a latch circuit can be utilized to store the last frame (i.e., the last exposure of sensor array 101) results. Auto focus is typically accomplished by averaging the AF value for a few frames, moving the focus motor, averaging the AF value for a few more frames, then looking at the difference in the AF values between measurements. In general, increasing AF values means focus is getting better and decreasing AF values means focus is becoming worse. The optimum technique for using the auto focus statistics are up to the customer's firmware. The statistics are generated by calculating the difference between horizontally adjacent Y values and squaring this value to obtain a value $DifH = (Y_{y,x} - Y_{y,x+1})^2$; calculating the difference between vertically adjacent Y values and squaring this value to obtain the value $DifV=(Y_{y,x}-Y_{y+1,x})^2$; and adding the values DifV and DifH to obtain DifSum.

Additionally, auto-exposure (AE) values can be calculated in statistics block 407 by counting the number of pixels with Y values above or below high and low threshold values. The exposure time for sensor array 101 can be set utilizing the AE value. In some embodiments, the high and low threshold values can be programmable. AE values can be summed in count registers and latches can be utilized to hold the results between frames.

The Y data block from RGB to Y 406 is also input to gamma correct 408. Gamma correct 408 performs a distortion correction on the numerical values of the Y block based on the magnitude of the numerical value itself. The range of the numerical Y values are separated into a number of segments and a linear interpolation is performed on the numerical values of the Y block based on which segment the numerical value falls within.

The calculation can be performed by first characterizing the numerical value as belonging within a certain range. A subset of the bits of the numerical value is then utilized to look-up a particular segment in a user-provided look-up table in order to obtain an offset and a slope characterizing the linear segment. The table of slopes and offsets can be written into memory 104 (FIG. 1). The numerical value is then replaced by the numerical interpolation. The output numerical values can be expressed as $$Y_{i,j}'=\text{offset(base)}+\text{slope(base)}*(\text{value of bits}),$$

where the base is the identification of which segment the $Y_{i,j}$ value falls within, the offset and slope are determined by the base, and the interpolation bits are some of the least significant bits of the numerical values for Y.

For example, in an embodiment where the numerical values $Y_{i,j}$ of the Y block are 10 bit unsigned values ranging from 0 to 1023, a 64 segment piecewise linear interpolation can be defined as indicated in Table I. As seen in Table I, in the range of values 0–31, 8 segments are defined and bits b4 . . . b2 can be utilized to define which segment the value falls within. Bits b4 . . . b2 can, therefore, be utilized to look-up the offset and slope values appropriate for that base in a look-up table written into memory 104. Bits b1 . . . b0 are the bits utilized for the interpolation. In some embodiments, the offset value can include the numerical value at the beginning of the segment. In some embodiments, the least significant bits are replaced by the results of the calculation.

In some embodiments, the base value is 10 bits unsigned and the slope value is 10 bits unsigned. A value of 128, then, indicates a 1:1 slope. The output value, which then can replace the numerical values of the Y block, are 10 bit unsigned data. In some embodiments, the look-up table and Table I are writeable into memory 104 during operation.

TABLE I

| Input Value | # of Segments | Bits used to select base | Bits used to interpolate |
|---|---|---|---|
| 0–31 | 8 | b4 . . . b2 | b1 . . . b0 |
| 32–127 | 12 | b6 . . . b3 | b2 . . . b0 |
| 128–639 | 32 | b8 . . . b4 | b3 . . . b0 |
| 640–1023 | 12 | b9 . . . b5 | b4 . . . b0 |

The luminance Y data block output from gamma correct 408 is input into edge enhance block 409. Edge enhance block 409 detects and enhances edges in order to sharpen the image designated by the Y block. The input data from gamma correct block 408 to edge enhance block 409 is a (N−m)×(N−m) block of numerical values designating lumina, Y. In some embodiments, where the original pixel input block is 24×24 pixels and a 5-tap filter is utilized for both horizontal and vertical interpolation in interpolation block 405, the block of Y data input to edge enhance 409 is, then, a 20×20 block of data. In some embodiments, each numerical value is represented by a 10-bit unsigned value.

In edge enhance block 409, an edge can be detected utilizing a 3×3 filter on the block of Y data. In some embodiments, an edge detection kernel can be utilized as the filter. In some embodiments, a low-pass filter can be applied. In some embodiments, the application of the particular filter can be programmed.

Figure 6A:
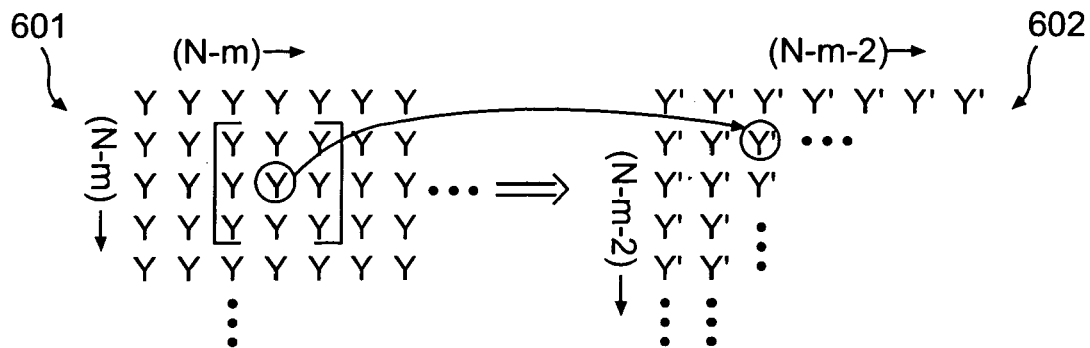
FIG. 6A illustrates the filtering for edge enhancement in the lumina filter path of the ECIP block shown in FIG. 4.

As illustrated in FIG. 6A, numerical values from the Y block 601 are mapped into numerical values for the Y' block 602. Because a 3×3 filter is utilized during the mapping, the edge pixels (i.e., rows 1 and (N−m) and columns 1 and (N−m)) are lost in the mapping and Y' block 602 is a (N−m−2)×(N−m−2) block. If block 601 is a 20×20 block, for example, then, the output from edge enhance block 409 is an 18×18 block.

In an embodiment that utilizes an edge detection kernel, the edge detection kernel can be expressed as $$\begin{bmatrix} -1 & -1 & -1 \\ -1 & 8 & -1 \\ -1 & -1 & -1 \end{bmatrix}.$$

The actual numerical values are chosen so that the sum of all contributions are 0. For each mappable numerical value in Y block 601, a value X is calculated from the above matrix. As such, for the mapping of $Y_{i,j}$, for example, X can be expressed as $$X=-1*Y_{i-1,j-1}-1*Y_{i,j-1}-1*Y_{i+1,j-1}-1*Y_{i-1,j}+8*Y_{i,j}-1*Y_{i+1,j}-1*Y_{i-1,j+1}-1*Y_{i,j+1}-1*Y_{i+1,j+1}$$

The value X can then be compared with a programmable threshold value. If X is less than the threshold value, a value $Y_p$ can be set to 0. If X is greater than or equal to the threshold value, then $Y_p$ can be set to X*(a programmable gain coefficient). The value $Y_p$ can then be added to the numerical value $Y_{i,j}$ that is currently being mapped to form $Y'_{i,j}$, i.e.

$$Y_{i-1,j-1}'=\alpha*Y_p+Y_{i,j},$$

where α represents the programmable gain coefficient.

In some embodiments, the value X can be represented by an 8 bit unsigned value, the value α can be represented by an 8-bit unsigned value, and the value of $Y_p$ can be represented by a 9-bit unsigned value. In some embodiments, $Y_p$ is clamped between programmable low and high values. The output $Y'_{i,j}$ can then be rounded and represented by 8-bit unsigned data with a low clamped at 0 and a high clamped at 255.

In some embodiments, edge enhance 409 can implement a low pass filter followed by alpha-blending. FIG. 6 illustrates the mapping of one numerical value Y from block 601 to a numerical value Y' in block 602. The low pass filter can be expressed as the matrix $$\begin{bmatrix} p_{-1,-1} & p_{0,-1} & p_{1,-1} \\ p_{-1,0} & p_{0,0} & p_{1,0} \\ p_{-1,1} & p_{0,1} & p_{1,1} \end{bmatrix}.$$

The output of the low pass filter for numerical value $Y_{i,j}$ of Y block 601, then, can be given by $$X = \left(\sum_{k=-1}^{1}\sum_{l=-1}^{1} p_{k,l} * Y_{i+k,j+l}\right) * 114/1024.$$

A value $Y_p$ can then be computed as $$Y_p = p_{0,0}*\alpha + (1-\alpha)*X.$$

Again, the value of $Y_p$ can be added to $Y_{i,j}$ to form $Y'_{i-1,j-1}$. The parameters $p_{k,l}$ of the low pass filter can be user defined and are designed to enhance edges. In some embodiments, the value of $Y'_{i,j}$ is rounded and represented by an 8-bit unsigned data value with a low range clamped at 0 and a high range clamped at 255.

The data output from edge enhance 409 is input to spatial filter 410. Spatial filter 410 further enhances the edge effects and is sensitive to various types of edges. A set of masks, each of which is sensitive to a type of edge, can be applied to sub-blocks of the Y data block to detect edges in the sub-block. Depending on the type of edge detected, a particular mapping of the sub-block can be applied.

Figure 6B:
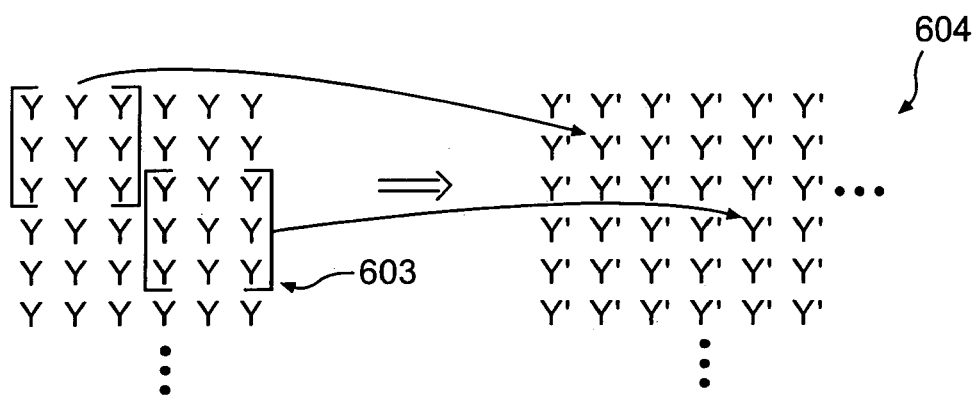
FIG. 6B illustrates the operation of the spatial filter of the lumina filter path of the ECIP block shown in FIG. 4.

FIG. 6B shows a mapping of the (N–m–2)×(N–m–2) Y data block 603, which was received by spatial filter 410 from edge enhance 409, into filtered block 604. In some embodiments, the masks are 3×3 arrays. Therefore, 3×3 sub-blocks of Y data block 603 are mapped into filtered block 604. In some embodiments, the masks can be given by:

$$\text{mask } 1 = \begin{bmatrix} 0 & 0 & 0 \\ -1 & 2 & -1 \\ 0 & 0 & 0 \end{bmatrix},$$

which is sensitive to a horizontal line;

$$\text{mask } 2 = \begin{bmatrix} 0 & -1 & 0 \\ 0 & 2 & 0 \\ 0 & -1 & 0 \end{bmatrix},$$

which is sensitive to a vertical line;

$$\text{mask } 3 = \begin{bmatrix} -1 & 0 & 0 \\ 0 & 2 & 0 \\ 0 & 0 & -1 \end{bmatrix},$$

which is sensitive to a left-to-right downward diagonal line;

$$\text{mask } 4 = \begin{bmatrix} 0 & 0 & -1 \\ 0 & 2 & 0 \\ -1 & 0 & 0 \end{bmatrix},$$

which is sensitive to the right-to-left downward diagonal line, $$\text{mask } 5 = \begin{bmatrix} 0 & 0 & 0 \\ 0 & 2 & -1 \\ 0 & -1 & 0 \end{bmatrix},$$

which is sensitive to a left-top corner;

$$\text{mask } 6 = \begin{bmatrix} 0 & 0 & 0 \\ -1 & 2 & 0 \\ 0 & -1 & 0 \end{bmatrix},$$

which is sensitive to a right-top corner;

$$\text{mask } 7 = \begin{bmatrix} 0 & -1 & 0 \\ -1 & 2 & 0 \\ 0 & 0 & 0 \end{bmatrix},$$

which is sensitive to a right-bottom corner; and $$\text{mask } 8 = \begin{bmatrix} 0 & -1 & 0 \\ 0 & 2 & -1 \\ 0 & 0 & 0 \end{bmatrix},$$

which is sensitive to a left-bottom corner. In general, other masks can be utilized to detect various other shapes as well as these.

For an arbitrary 3×3 sub-block of Y-data block 603, each of the masks are applied to the sub-block. A mask, in general, can be depicted as $$\text{mask} = \begin{bmatrix} s_1 & s_2 & s_3 \\ s_4 & s_5 & s_6 \\ s_7 & s_8 & s_9 \end{bmatrix}$$

and can be applied to a 3×3 sub-block of Y data block 701 centered around $Y_{i,j}$. The resulting value can then be given by $$\text{Value} = s_1*Y_{i-1,j-1} + s_2*Y_{i-1,j} + s_3*Y_{i-1,j+1} + s_4*Y_{i,j-1} + s_5*Y_{i,j} + s_6*Y_{i,j+1} + s_7*Y_{i+1,j-1} + s_8*Y_{i+1,j} + s_9*Y_{i+1,j+1}.$$

When values are compiled for all of the masks, the minimum value determines the filter that is applied to the 3×3 sub-block of Y data 603 centered around $Y_{i,j}$.

In some embodiments, the filters associated with each mask can be given by $$\text{filter } 1 = \frac{1}{4}\begin{bmatrix} 0 & 0 & 0 \\ 1 & 2 & 1 \\ 0 & 0 & 0 \end{bmatrix},$$

which is applied if the value corresponding to mask 1 is the minimum value;

$$\text{filter } 2 = \frac{1}{4}\begin{bmatrix} 0 & 1 & 0 \\ 0 & 2 & 0 \\ 0 & 1 & 0 \end{bmatrix},$$

which is applied if the value corresponding to mask 2 is the minimum value;

$$\text{filter } 3 = \frac{1}{4}\begin{bmatrix} 1 & 0 & 0 \\ 0 & 2 & 0 \\ 0 & 0 & 1 \end{bmatrix},$$

which is applied if the value corresponding to mask 3 is the minimum value;

$$\text{filter } 4 = \frac{1}{4}\begin{bmatrix} 0 & 0 & 1 \\ 0 & 2 & 0 \\ 1 & 0 & 0 \end{bmatrix},$$

which is applied if the value corresponding to mask 4 is the minimum value;

$$\text{filter } 5 = \frac{1}{4}\begin{bmatrix} 0 & 0 & 0 \\ 0 & 2 & 1 \\ 0 & 1 & 0 \end{bmatrix},$$

which is applied if the value corresponding to mask 5 is the minimum value;

$$\text{filter } 6 = \frac{1}{4}\begin{bmatrix} 0 & 0 & 0 \\ 1 & 2 & 0 \\ 0 & 1 & 0 \end{bmatrix},$$

which is applied if the value corresponding to mask 6 is the minimum value;

$$\text{filter } 7 = \frac{1}{4}\begin{bmatrix} 0 & 1 & 0 \\ 1 & 2 & 0 \\ 0 & 0 & 0 \end{bmatrix},$$

which is applied if the value corresponding to mask 7 is the minimum value; and $$\text{filter } 8 = \frac{1}{4}\begin{bmatrix} 0 & 1 & 0 \\ 0 & 2 & 1 \\ 0 & 0 & 0 \end{bmatrix},$$

which is applied if the value corresponding to mask 8 is the minimum value.

With the general equation for a filter being given by $$\text{filter} = \begin{bmatrix} f_{-1,-1} & f_{-1,0} & f_{-1,+1} \\ f_{0,-1} & f_{0,0} & f_{0,+1} \\ f_{+1,-1} & f_{+1,0} & f_{+1,+1} \end{bmatrix},$$

the mapped value for $Y_{i,j}$ can be given by $$Y'_{i,j} = \sum_{k=-1}^{1} \sum_{l=-1}^{1} f_{k,l} * Y_{i+k,j+l}.$$

In some embodiments, edge values for $Y_{i,j}$ can be mapped directly, without a filter, to edge values of $Y'_{i,j}$. Therefore, filter block 604 is the same size as Y data block 603. In some embodiments, the edge values are not mapped so that the size of the filtered data block output from spatial filter 410 is (N−m−4)×(N−m−4), or 16×16 for N=24 and m=4.

The output signal from spatial filter 410, which is now a (N−m−4) by (N−m−4) block of data, is rewritten back to memory 104 by transmission interface 416. In embodiments where a 5-tap filter is utilized in interpolation block 405, and therefore m=4, and N=24, then the Y block of lumina data is an 16×16 block of lumina data Y.

The data output by white balance 404, the N×N pixel block, is input to interpolate block 411 of chroma filter path 422. Again three separate color planes, one for green, one for red, and one for blue, are determined based on the RGB data in the pixel block. Color values are determined for each pixel location in the block based on the numerical values for those colors in the RGB data. Although interpolation block 411 may be functionally of similar form to interpolation block 405 of lumina filter path 420, different considerations in data between lumina data and chroma data result in the use of different filters.

In some embodiments, interpolation block 405 utilizes 5-tap filter in interpolation for both vertical and horizontal filtering. In some embodiments, interpolation block 411 utilizes a 7-tap filter. The coefficients of the 7-block filter can be chosen to improve moiré rejection and suppress false color due to color aliasing. In general, more taps can be utilized in the interpolation 411 in chroma filter path 422 than in interpolation 405 in luma filter path 420 because the human eye is more sensitive to spatial distortion than it is to color distortion.

Figure 7A:
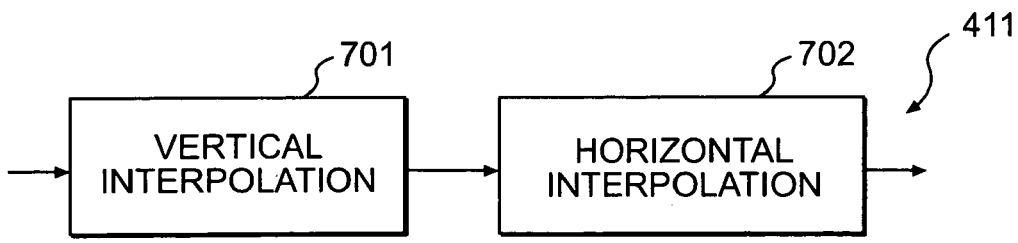
FIG. 7A shows a block diagram of the interpolation block of the chroma filter path of the ECIP block shown in FIG. 4.

FIG. 7A shows a block diagram of interpolation 411 of chroma filter path 422. Interpolation 411 includes a vertical interpolation 701 and a horizontal interpolation 702. Although in the embodiment shown in FIG. 7A vertical interpolation 701 is executed before horizontal interpolation 702, in general the order can be reversed. Additionally, some other embodiments may utilize filters that interpolate the numerical value of a color at a pixel location based on numerical values of pixels of that color surrounding the location in both vertical and horizontal directions in one calculation.

Figure 7B:
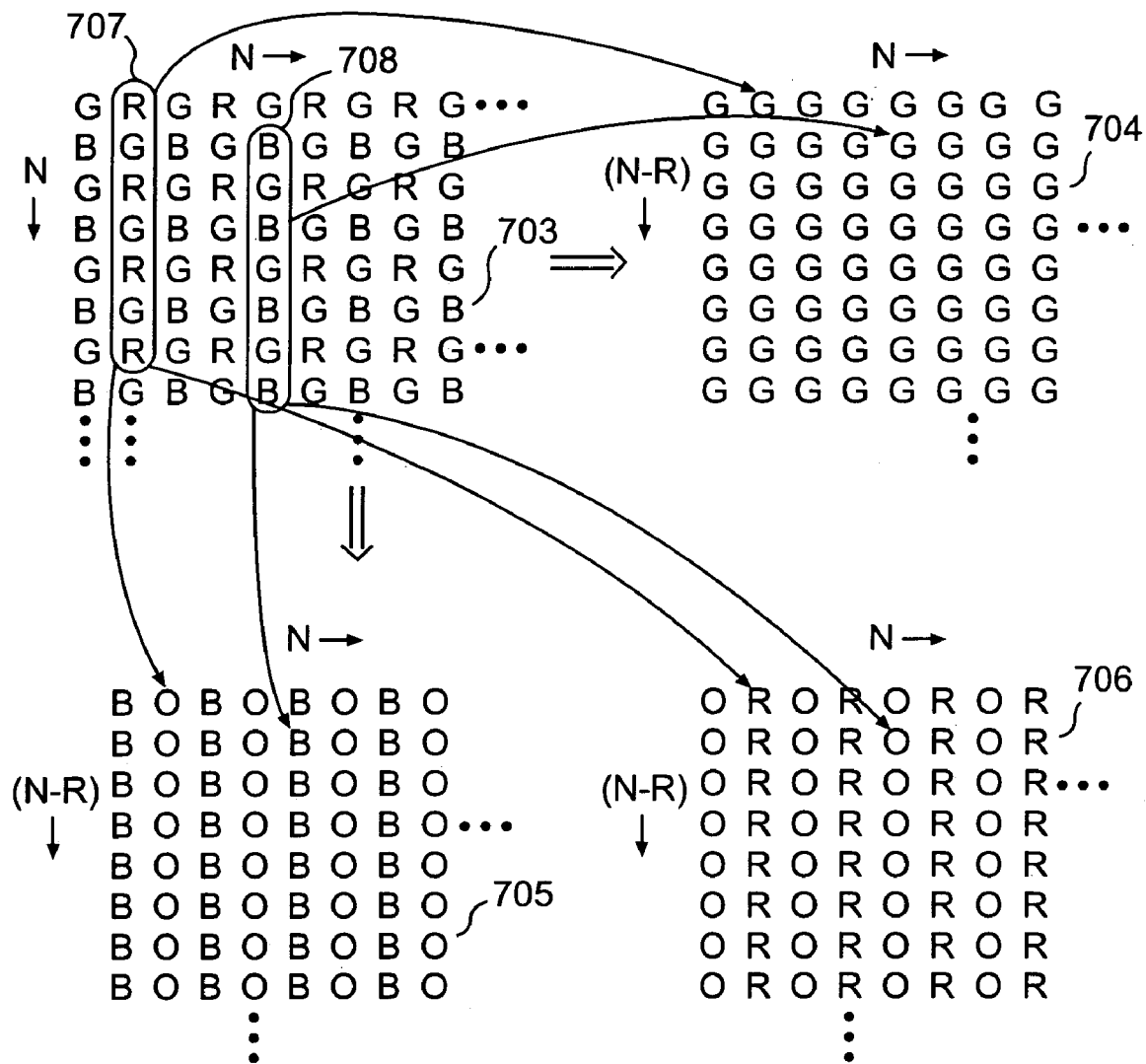
FIGS. 7B through 7E illustrate the vertical and horizontal interpolation for the chroma filter path of the ECIP block shown in FIG. 4.

FIG. 7B illustrates vertical interpolation 701. In general, a K-tap filter can be utilized. Because the eye is less sensitive to color variations, the value of K can be greater than the value of M utilized for lumina interpolation in interpolation 405. In some embodiments, K=7.

FIG. 7B illustrates the interpolation from the N×N pixel block 703 received by interpolation 411 into individual color planes 704, 705 and 706. To optimize the calculations, coefficients for filtering to one of color planes 704, 705 or 706 are not multiplied by numerical values in 703 that are not associated with that color. As illustrated, the size of color planes 704, 705 and 706 is reduced by k=K−1 columns. As depicted in FIG. 7B, green color plane 704 fills in all pixel locations with a green numerical value. However, because the blue and red pixels only occur every other column in pixel block 703, blue color plane 705 and red color plane 706 have alternating columns of zero or null values at completion of vertical interpolation 701.

In some embodiments, where N=24 and K=7, the pixel data block 703, which is a 24×24 block, is reduced in size to a 16×22 block in vertical interpolation 701. In chroma filter path 422, the outer edge of pixels is ignored because edge enhancement and spatial filtering need not be done, reducing pixel data block 703 to (N−2)×(N−2) (for N=24, pixel data block 703 because a 22×22 block in vertical interpolation 701) initially. In some embodiments, the filter coefficients can be given by (2,5,6,6,6,5,2). For mapping pixel group 707, which contains 7 pixel values in a column, to the indicated position in green color plane 704, only the green values are applied. The value in 704, then, is 5 times the first green value plus 6 times the second green value plus 5 times the last green value. The red value in red color plane 706 is given by 2 times the first red value plus 6 times the second red value plus 6 times the third red value plus 2 times the fourth red value. Since there are no blue pixels in the second column of filter block 703, the corresponding value in blue color plane 705 is 0. Similarly, group 708 can be mapped to green color plane 704, red color plane 706 and blue color plane 705.

The filter values are chosen, as discussed above, to optimize moiré rejection and suppress color aliasing. In addition, the values are picked for easy descaling (i.e., divide by 16). However, other filter values may be applied.

Once vertical interpolation 701 is complete, the three color planes 704, 705 and 706 are then horizontally filtered in horizontal interpolation 702. In some embodiments, the same 7-tap filter that was applied vertically in vertical interpolation 701 can now be applied horizontally on each of color planes 704, 705 and 706 in horizontal interpolation 702.

Figure 7C:
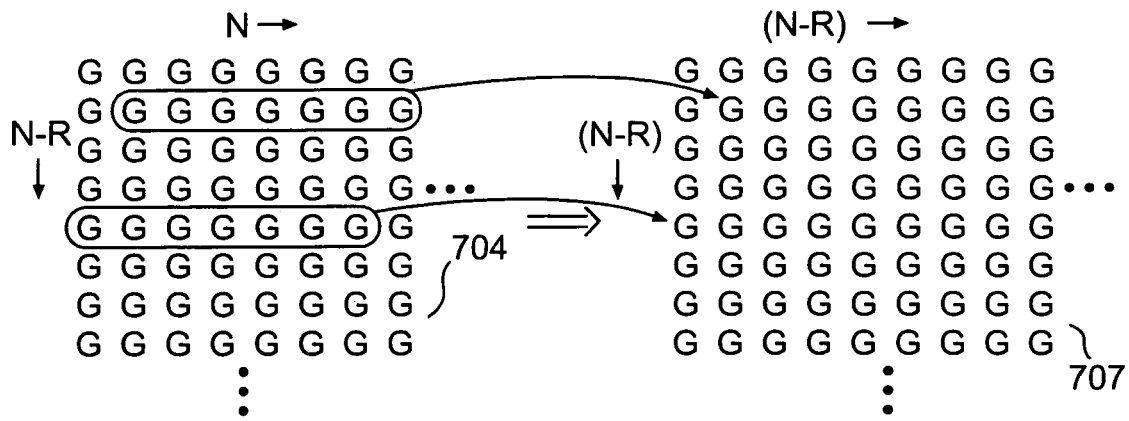
Figure 7D:
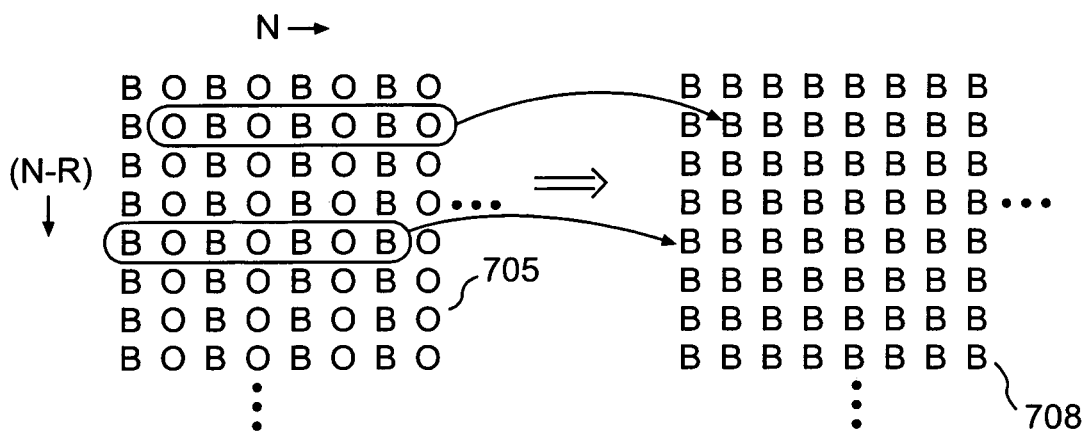
Figure 7E:
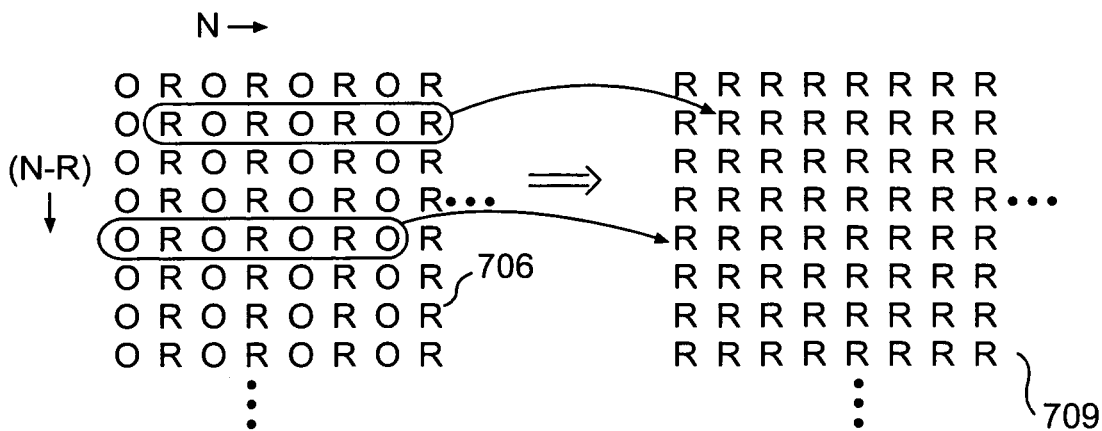

FIGS. 7C, 7D and 7E illustrate the horizontal interpolation. Green color plane 704 is mapped to green color plane 707; blue color plane 705 is mapped to blue color plane 708; and red color plane 706 is mapped to red color plane 709. As is illustrated, each of the color planes has a numerical value indicating that color in each pixel location. The size of color planes 707, 708 and 709 has then been reduced by k=K−1 both horizontally and vertically so that color planes 707, 708 and 709 are now (N−k)×(N−k) data blocks.

Where N=24 and K=7, color planes 707, 708 and 709 are 16×16 blocks. In some embodiments, the numerical values in color planes 707, 708 and 709 are 10-bit unsigned data low range clamped at 0 and high range clamped at 1023.

The output data from interpolation 411, the three color planes 707, 708 and 709, are input to color correction 412. In color correction 412, the numerical values are mixed to correct for color miss-interpretation in the original RGB data. As such, the mappings of green color plane 707, blue color plane 708, and red color plane 709 in color correct block 412 can be expressed as $$R_{i,j}'=\beta_0*R_{i,j}+\beta_1*G_{i,j}+\beta_2*B_{i,j}+\beta_9$$

$$G_{i,j}'=\beta_3*R_{i,j}+\beta_4*G_{i,j}+\beta_5*B_{i,j}+\beta_{10},$$

$$B_{i,j}'=\beta_6*R_{i,j}+\beta_7*G_{i,j}+\beta_8*B_{i,j}+\beta_{11}$$

where the coefficients $\beta_1$ through $\beta_{11}$ are user programmable. In some embodiments, the coefficients are 12-bit signed values where "512" is unity. The output numerical values for each of the mapped red, green and blue color planes can be 10-bit unsigned data with low range clamped at 0 and high range clamped at 1023. The output data from color correct 412 is input to gamma correct 413.

In gamma correct 413, each of the red, green and blue color planes are processed independently utilizing 64 segment piecewise linear interpolation. Any non-linearity in response for the pixels can be corrected in this fashion. In some embodiments, RGB correct 413 may utilize the same gamma table as gamma correct 408, which is shown in Table I. In some embodiments, a different segregation of segments may be utilized in gamma correct 413. In principle, however, the range determines the bit values to use for selecting a base value and a slope from a table that is stored in memory 104, and the bits to be interpolated. For example, in the range 32–127 bits b6 . . . b3 of the numerical value are utilized in a look-up table to obtain the base value and the slope for the appropriate segment and bits b2 . . . b0 are interpolated based on that linear segment. Therefore, the output numerical value is given by Output=base+slope*(value of interpolation bits).

Different look-up tables can be utilized for mapping the red, green and blue color planes. Additionally, the look-up tables may be writable during operation. The gamma tables (an example of which is shown in Table I) can be separately loadable in memory 104 for luma filter path 420 and chroma filter path 422.

The corrected red, green and blue color planes output from gamma correct 413 are then input to RGB to UV conversion 414. In conversion block 414, the data for each color plane can be down-sampled by averaging blocks of data. In some embodiments, 2×2 blocks of red, green, and blue color planes are utilized. In some embodiments, the down-sampling can be given by $$G'_{i,j}=(G_{i,j}+G_{i+1,j}+G_{i,j+1}+G_{i+1,j+1})/4$$

$$R'_{i,j}=(R_{i,j}+R_{i+1,j}+R_{i,j+1}+R_{i+1,j+1})/4,$$

$$B'_{i,j}=(B_{i,j}+B_{i+1,j}+B_{i,j+1}+B_{i+1,j+1})/4$$

where the primed values are the averaged values and the unprimed values are input to conversion block 414. The down-sampling average provides a 2:0 chroma, down sampled from 4:4. The output signal from conversion block 414, then, is an 8×8 block of data.

The U and V values are then calculated from the downsampled averages computed above. Values for U and V can be given by $$U_{i,j} = \gamma_0 * R_{i,j}' + \gamma_1 * G_{i,j}' + \gamma_2 * B_{i,j}' + \gamma_6$$

$$V_{i,j} = \gamma_3 * R_{i,j}' + \gamma_4 * G_{i,j}' + \gamma_5 * B_{i,j}' + \gamma_7.$$

The values of coefficients $\gamma_0$ through $\gamma_7$ are programmable coefficients. In some embodiments, these coefficients may be 12-bit signed values, where 1023 is about 1, allowing for a maximum chroma gain of about 2. In some embodiments, the output U and V values are 12-bit signed data with low range clamped at −2048 and high range clamped at 2047.

The U and V data output from RGB to UV conversion 414 is input to core chroma 415. For each pixel in both the U data block and the V data block, the sum of the absolute values of the U numerical value and the V numerical value is calculated. If the sum is greater than a threshold value, the U and V values are unchanged. If the values are less than a threshold value, then U and V are each multiplied by the sum and a multiplier. Both the threshold value and the multiplier are programmable. In some embodiments, the threshold value can be an 11-bit unsigned value and the multiplier can be a 12-bit unsigned coefficient, where 4097 is about 1. The output numerical values for U and V can be 8-bit signed data with a low clamped at −128 and a high clamped at 127.

The U and V data blocks output from chroma filter path 422 and the Y data block output from lumina filter block 420 are input to transmission interface 416, where they are written into memory 104. As seen in FIG. 1, these values may be filtered in filter 107 before encoded by encoding block 109. The final encoded data is transmitted through transmission interface 108.

An example of MPEG-4 Encoding 109 is provided in U.S. application Ser. No. 10/346,736, assigned to the same assignee as is the present invention, herein incorporated by reference in its entirety.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An image processing module, comprising:
   an input to receive a RGB data signal; and
   an output to provide a YUV data signal corresponding to the RGB data signal,
   wherein the YUV data signal includes Y data derived from a first interpolation of the RGB data, wherein the first interpolation utilizes a M-tap filter,
   wherein the YUV data signal further includes UV data derived from a second interpolation of the RGB data, wherein the second interpolation utilizes a K-tap filter, and
   wherein M is less than K.

2. The image processor of claim 1, wherein the UV data is converted from downsampled color plane data generated by the second interpolation.

3. The image processor of claim 1, wherein the Y data has been gamma corrected only after the first interpolation.

* * * * *